US007266385B2

(12) United States Patent
Koo et al.

(10) Patent No.: US 7,266,385 B2
(45) **Date of Patent: *Sep. 4, 2007**

(54) METHOD AND SYSTEM FOR ADJUSTING DOWNLINK OUTER LOOP POWER TO CONTROL TARGET SIR

(75) Inventors: Chang-Soo Koo, East Northport, NY (US); Sung-Hyuk Shin, Northvale, NJ (US); Charles Dennean, Melville, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 506 days.

This patent is subject to a terminal disclaimer.

(21) Appl. No.: 10/771,576

(22) Filed: Feb. 4, 2004

(65) Prior Publication Data

US 2004/0157636 A1 Aug. 12, 2004

Related U.S. Application Data

(63) Continuation of application No. 10/659,673, filed on Sep. 10, 2003, now Pat. No. 7,133,689.

(60) Provisional application No. 60/410,781, filed on Sep. 12, 2002.

(51) Int. Cl.
*H04B 7/00* (2006.01)

(52) U.S. Cl. .................. 455/522; 455/115.1; 455/506; 455/69

(58) Field of Classification Search ................ 455/522, 455/69, 506, 453, 504, 505; 370/318, 340; 375/148
See application file for complete search history.

(56) References Cited

U.S. PATENT DOCUMENTS

| | | | | |
|---|---|---|---|---|
| 6,622,024 | B2 | 9/2003 | Koo et al. | |
| 6,965,780 | B1 * | 11/2005 | Monogioudis et al. | 455/522 |
| 7,020,127 | B2 * | 3/2006 | Iacono et al. | 370/342 |
| 2002/0187802 | A1 * | 12/2002 | Agin et al. | 455/522 |
| 2003/0021243 | A1 * | 1/2003 | Hamalainen | 370/329 |
| 2003/0036403 | A1 * | 2/2003 | Shiu et al. | 455/522 |
| 2003/0054849 | A1 | 3/2003 | Koo et al. | |
| 2004/0087327 | A1 * | 5/2004 | Guo | 455/522 |
| 2004/0106425 | A1 * | 6/2004 | Koo et al. | 455/522 |
| 2005/0215276 | A1 * | 9/2005 | Koo et al. | 455/522 |
| 2006/0003789 | A1 * | 1/2006 | Murata et al. | 455/522 |
| 2006/0099913 | A1 * | 5/2006 | Nilsson et al. | 455/69 |

FOREIGN PATENT DOCUMENTS

| | | |
|---|---|---|
| KR | 2006/0002799 | 1/2006 |

* cited by examiner

*Primary Examiner*—Matthew Anderson
*Assistant Examiner*—Tan Trinh
(74) *Attorney, Agent, or Firm*—Volpe and Koenig, P.C.

(57) ABSTRACT

A wireless communication system and method for controlling transmission power to maintain a received signal-to-interference ratio (SIR) as close as possible to a target SIR. A received quality is maintained as close as possible to a target quality based on block error rate (BLER). When a target BLER is converted to an initial target SIR, an error may occur due to a channel condition mismatch, since the target SIR required for the target BLER varies with channel conditions. An outer loop power control process is used to set a target SIR for each coded composite transport channel (CCTrCH) based on the required target BLER. The process adjusts a SIR step size parameter to maximize the convergence speed of the process.

18 Claims, 6 Drawing Sheets

METHOD AND SYSTEM FOR ADJUSTING DOWNLINK OUTER LOOP POWER TO CONTROL TARGET SIR

CROSS REFERENCE TO RELATED APPLICATION(S)

This application is a continuation of U.S. application Ser. No. 10/659,673, filed Sep. 10, 2003 now U.S. Pat. No. 7,133,689 which claims priority from U.S. Provisional Application No. 60/410,781, filed on Sep. 12, 2002, which is incorporated by reference as if fully set forth.

FIELD OF INVENTION

The present invention relates to the field of wireless communications. More specifically, the present invention relates to compensating for changing channel conditions and by adjusting the step size of a target signal-to-interference ratio (SIR).

BACKGROUND

Spread spectrum time division duplex (TDD) systems carry multiple communications over the same spectrum. The multiple signals are distinguished by their respective chip code sequences (codes). In one configuration, TDD systems use repeating frames divided into a number of time slots, such as fifteen time slots. In such systems, a communication is sent in a selected time slot out of the plurality of time slots, and one frame is capable of carrying multiple communications distinguished by both time slot and code. The combination of a single code in a single time slot is referred to as a physical channel. Based on the bandwidth required to support a communication, one or multiple physical channels are assigned to support that communication.

Most TDD systems adaptively control transmission power levels. In a TDD system, many communications may share the same time slot and spectrum. While a wireless transmit and receive unit (WTRU) is receiving a downlink transmission from a base station, all of the other communications using the same time slot and spectrum cause interference to the specific communication. Increasing the transmission power level of one communication degrades the signal quality of all other communications within that time slot and spectrum. Reducing the transmission power level too far results in undesirable signal to noise ratios (SNRs) and bit error rates (BERs) at the receivers. To maintain both the signal quality of communications and low transmission power levels, transmission power control is used.

The purpose of power control is to use the minimum power required to adequately transmit a communication. One measure of power control in TDD for example, may be to use the minimum power to allow each transport channel (TrCH) to operate with a Block Error Rate (BLER) that does not exceed its required level. The standard approach to TDD downlink power control is a combination of inner and outer loop control. In this standard approach, a base station sends a transmission to a particular WTRU. Upon receipt, the WTRU measures the SIR in all time slots and compares this measured value to a target SIR. This target SIR is generated from the BLER signaled from the base station. As a result of a comparison between the measured SIR value and the target SIR, the WTRU transmits a physical layer transmit power control (TPC) command to the base station. The standard approach provides for one TPC command per coded composite transport channel (CCTrCH). The CCTrCH is a physical channel which comprises the combined units of data for transmission over the radio interface to and from the WTRU or base station. This TPC command instructs the base station to adjust the transmission power level of the downlink communication. The base station, which is set at an initial transmission power level, receives the TPC command and adjusts the transmit power level in all time slots associated with the CCTrCH in unison.

An inner loop power control process controls transmit power to maintain the received SIR as close as possible to a target SIR by monitoring the SIR measurements of the data. An outer loop power control process controls the target SIR to maintain the received quality BLER as close as possible to a target quality BLER based on a cyclic redundancy code (CRC) check of the data. The output from the outer loop power control is, a new target SIR per CCTrCH used for the inner loop power control.

There are four main error sources in transmission power control: 1) systematic error; 2) random measurement error; 3) CCTrCH processing error; and 4) channel error. The systematic error and the random measurement error are corrected reasonably by the inner loop power control monitoring the SIR measurements. The CCTrCH processing error is corrected by either the outer loop power control or the inner loop power control by using relative SIR measurements among the codes. The channel error is related to unknown time varying channel conditions.

In power control systems, the outer loop power control process sets a target SIR for each CCTrCH based on the required target BLER, assuming a most plausible channel condition. Therefore, the mismatch between the target BLER and the mapped target SIR varies depending on the actual channel condition, and it is especially large at very low BLER. Since the outer loop power control depends on the CRC check, it often takes a long time to converge to the required target SIR for the low BLER.

Accordingly, there is a need for outer loop power control which determines the actual channel conditions so that a proper value for the target SIR is used.

SUMMARY

Outer loop power control is performed in a series of iterations. After initial parameters are set, a transient state optimization of SIRs based on errors is performed in incremental steps. A determination is then made of a steady state.

In one configuration, an outer loop power process is used to control transmit power by monitoring SIRs and adjusting the power process to control a target SIR so as to maintain a received signal quality as close as possible to a target quality. Mismatch errors are evaluated by BLER as a measurement of received quality, and an output from the outer loop power may be used to obtain a new target SIR, thereby quickly compensating for a mismatch in SIR when channel conditions change. The invention finds particular utility for use in a digital wireless communications network.

BRIEF DESCRIPTION OF THE DRAWING(S)

The objectives of the present invention will become apparent upon consideration of the accompanying detailed description and figures, in which.

DETAILED DESCRIPTION OF THE PREFERRED EMBODIMENT(S)

Figure 1:
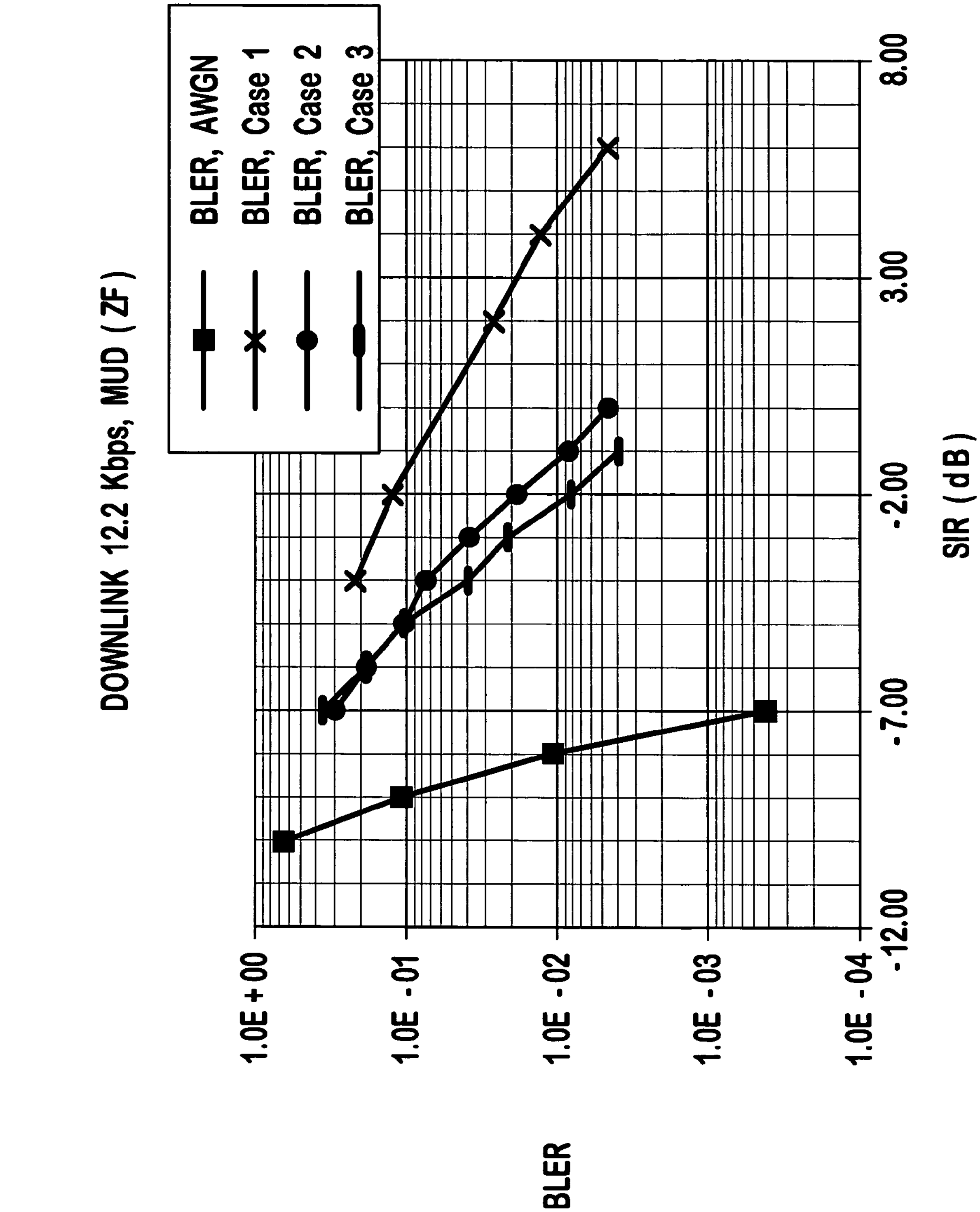
FIG. 1 shows typical downlink simulation results of WCDMA TDD for various channel conditions specified in 3GPP using a zero-forcing multi-user detector.

Presently preferred embodiments are described below with reference to the drawing figures wherein like numerals represent like elements throughout.

Although the preferred embodiments are described in conjunction with a third generation partnership program (3GPP) wideband code division multiple access (W-CDMA) system utilizing the time division duplex mode, it is to be noted that the invention in its broad form is also applicable to other systems of transmission, without limitation. For example, the embodiments are applicable to any closed loop power control application and may be applied to frequency division duplex (FDD), time division synchronous code-division multiple access (TDS CDMA), CDMA2000, and IEEE standard 802.11.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Transmit power control processes may comprise an inner loop power control, an outer loop power control, or a combination of inner loop and outer loop power control. In accordance with the present invention, both inner loop and outer loop power control processes are employed. The inner loop power control process controls transmit power to maintain the received SIR as close as possible to a target SIR by monitoring the SIR measurements of the data. The outer loop power control process controls the target SIR to maintain the received quality as close as possible to a target quality. A typical measurement of received quality is BLER based on a CRC check of the data. The output from the outer loop power control is a new target SIR used for the inner loop power control.

Since the channel condition is not known, the outer loop power control process converts the required target BLER to a target SIR based upon a "most plausible" channel condition. For example, FIG. 1 shows typical downlink simulation results of WCDMA TDD for various channel conditions specified in 3GPP using a zero-forcing multi-user detector. Results are shown for various propagation conditions. Additive white Gaussian noise (AWGN) is the static channel, while Case 1 through 3 are fading channels with different multipath profiles. At a required BLER of 0.01 for a Case 1 fading channel, a predetermined transmission power can be determined from the target SIR of approximately 4.5 dB. Note that this is more than 5dB over the target SIR for the case 2 fading channel and more than 12 dB over the target SIR for AWGN, illustrating the large span of SIR values depending on the assumed propagation condition. Therefore a target SIR could be selected based on Case 1 or an average of all channel conditions (AWGN, Case 1, 2, 3).

Based on the above example, the mismatch between the required BLER and the mapped target SIR varies depending on the actual channel condition and it is large especially at very low BLERs. Since the outer loop power control depends on the CRC check, it will take a long time to converge to the required target SIR for the low BLER. Hence the fast convergent process of the present invention attempts to quickly compensate for the mismatch between the assumed and actual channel conditions and accelerate the convergence speed when excessive target SIR occurs due to a favorable change in the channel conditions by increasing step size of the jump algorithm temporarily.

Figure 2:
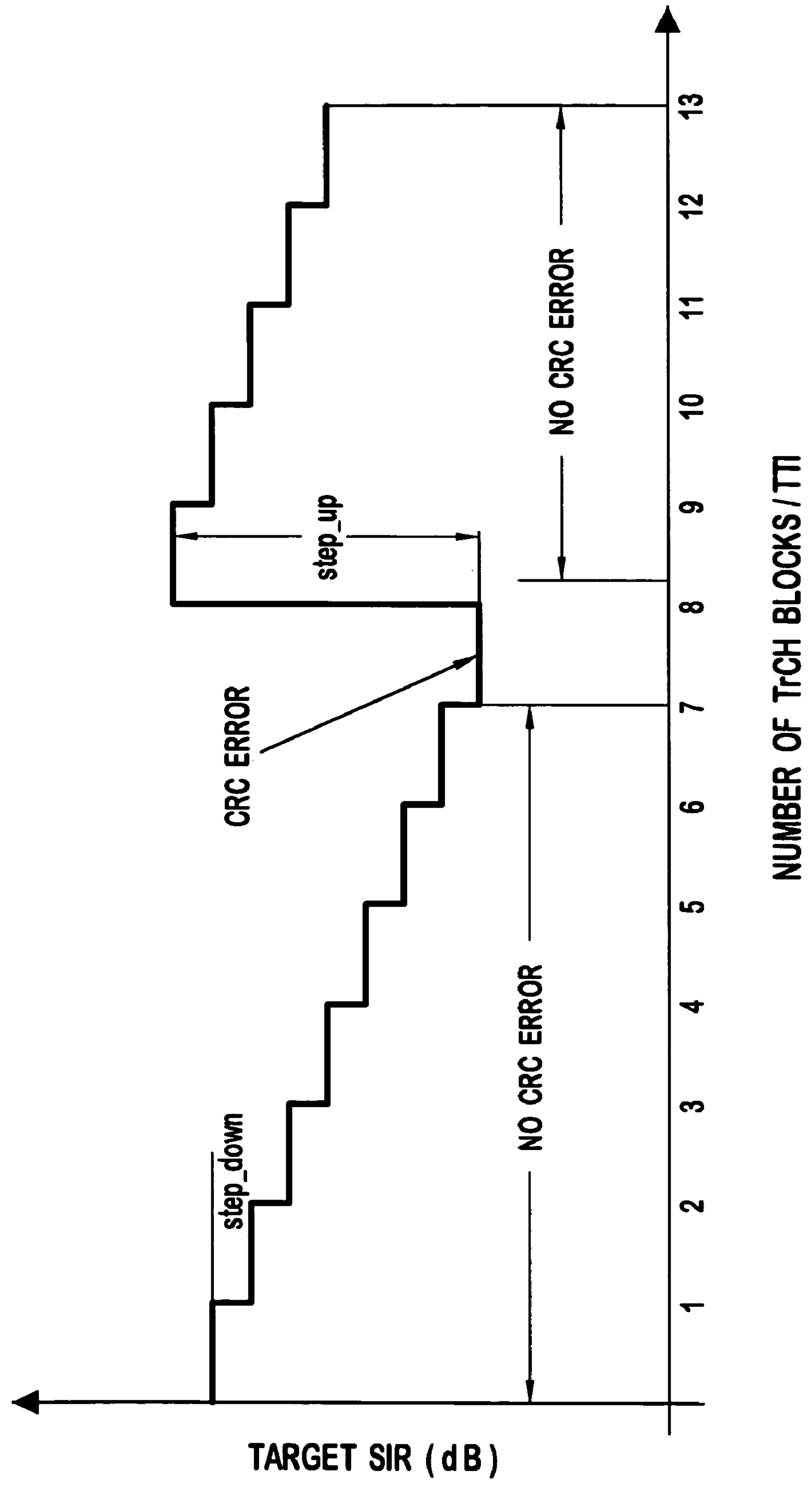
FIG. 2 is a graph of a target SIR versus a number of TrCH blocks used by a jump algorithm.

FIG. 2 is a graphical illustration of the results of employing a jump algorithm in accordance with the present invention. The DL outer loop power control process basically utilizes the jump algorithm that adjusts a target SIR based on the result of CRC check of the data at varying rates of TrCH blocks per transmission time interval (TTI).

As will be explained in greater detail hereinafter, the DL outer loop power control process comprises three states: the inner loop settling state, the transient state, and the steady state.

In the inner loop settling state, the inner loop transmission power control (TPC) process corrects the initial system systematic error and the random measurement error without changing the initial target SIR.

In the transient state, the outer loop power control process attempts to correct the initial target SIR error caused by the channel condition mismatch. Initially, the jump algorithm in the transient state uses a large step size to decrease the target SIR rapidly, (i.e., it forces a CRC error to occur). The initial large step size is calculated based upon the target BLER and the number of transport blocks per TTI ($N_b$) for the reference TrCH as follows:

$$SIR\_step\_size=2*[\log_{10}(1/BLER)]/N_b \text{ dB.} \qquad \text{Equation (1)}$$

Once a CRC error occurs, the step size is reduced to one half and then applied to the jump algorithm. The same procedure iterates until the new step size converges to the step size of the steady state, which is calculated as follows:

$$SIR\_step\_size=0.25*[\log_{10}(1/BLER)]/N_b \text{ dB.} \qquad \text{Equation (2)}$$

In the steady state, the target SIR is adjusted up or down with the steady state step size based on each CRC check. If no CRC error occurs within a long observation period (5/BLER consecutive transport blocks), the SIR_step_down is temporarily doubled.

Alternatively, the steady state is changed back to the beginning of the transient state such that the step size is set to the initial large step size and is gradually reduced to one half whenever a CRC error occurs. This improves the convergence time when a sudden improvement in channel conditions occurs, giving rise to an excessive measured SIR compared to the desired target SIR.

Figure 3:
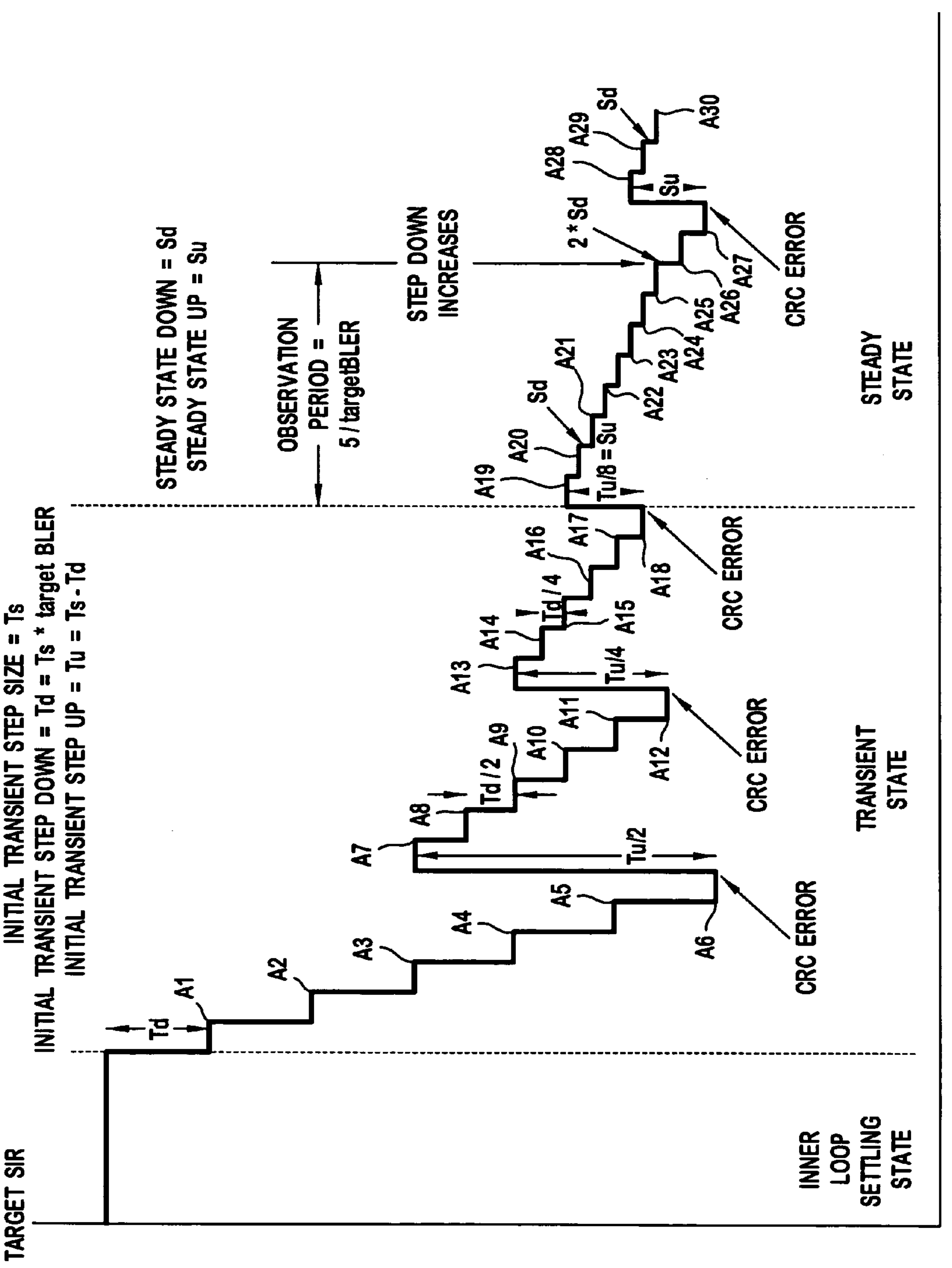
FIG. 3 illustrates the different states of an exemplary target SIR adjustment process used in accordance with the present invention.

FIG. 3 shows the three different states of an exemplary SIR adjustment process. In this example, several transport blocks are received without CRC error after the transient state is entered, resulting in multiple decreases (see points A1, A2, A3, A4, A5, A6) of Td in the target SIR. At point A6, Td represents the initial value of SIR_step_down. A CRC error then occurs, and the target SIR is increased by Tu/2 to point A7. At point A7, Tu represents the initial value of SIR_step_up. The CRC error also causes an adjustment in the step down size whereby subsequent transport blocks received without a CRC error result in a decrease in target SIR by Td/2 (see points A8, A9, A10, A11, A12).

When the next CRC errors occurs, the step up size is reduced to Tu/4 at point A13, target SIR is increased by that amount, and the step down size is adjusted to Td/4 (see points A14, A15, A16, A17, A18). This process continues until the adjusted step up size equals the steady state step up, which in this example is equal to Tu/8 at point A19. At point A19, steady state is entered, and the step up and step down sizes are fixed at Su and Sd, respectively, in which Su is steady state value of SIR_step_up (see point A28) and Sd is the steady state value of SIR_step_down (see points A20, A21, A22, A23, A24, A25). When no CRC error occurs for 5/BLER consecutive transport blocks, the step down size is temporarily increased to 2*Sd (see points A26, A27). It remains at that value until a CRC error occurs, when it is then returned to Sd (see points A29, A30). The steady state continues for the life of the CCTrCH. The process may return to the transient state to reduce convergence time. Since the transient state uses the larger step size, the response time is faster, i.e., it reduces convergence time.

This example is based on the variable that the first transport block after settling state is received without error, and the target SIR is decrease by Td. It is possible that the initial CRC result can indicate an error, which would result in an initial increase in target SIR by Tu/2, and setting of the step down size to Td/2. It is also possible (but not shown in this example) that the first CRC result after a step up indicates an error. In this case, target SIR is increased again, but by half the previous increase (i.e., if a CRC error occurs and target SIR is increased by Tu/4, and the next CRC result also indicates an error, the target SIR is increased by Tu/8, and the step down size is set to Td/8).

In this example only one transport block is received in each TTI. If more than one transport block is received, each good CRC will result in a step down, and each CRC error will result in a step up, but the step size will only be adjusted once per TTI (at the beginning) and only if at least one CRC error is present in the TTI: the outer loop process first determines whether any CRC errors occur in this new TTI, adjusts the up and down step sizes appropriately, then applies the step adjustments based on the individual CRC results.

For example, consider a TTI with four transport blocks, three of which indicate a CRC error. If the step up size is Tu/2 and the step down size is Td/2 prior to this TTI, the outer loop process will first adjust the step sizes to Tu/4 and Td/4, and then update the target SIR appropriately. The net result is that targetSIRnew=targetSIRold−(Td/8)+3*(Tu/8).

In both the transient and steady states, if the reference TrCH changes (i.e., for variable bit rate (VBR) services), and the BLER of that new reference is different from the old, the SIR step sizes are recalculated based on the new target BLER. In steady state, the observation period is also updated, and the current count of blocks without error is reset to 0. In transient state, in addition to recalculating the step sizes, an additional adjustment is be made to account for the "convergence" that may already have occurred in this state. For example, if the current step down size before reference TrCH reselection is $Td_{old}/4$, then the step down size immediately after TrCH reselection is be set to $Td_{new}/4$ and the step up size is be set to $Tu_{new}/4$. Thus, the calculated values are divided by $2^n$, where n is the number of TTIs since the start of transient state that contained at least one CRC error.

Figure 4A:
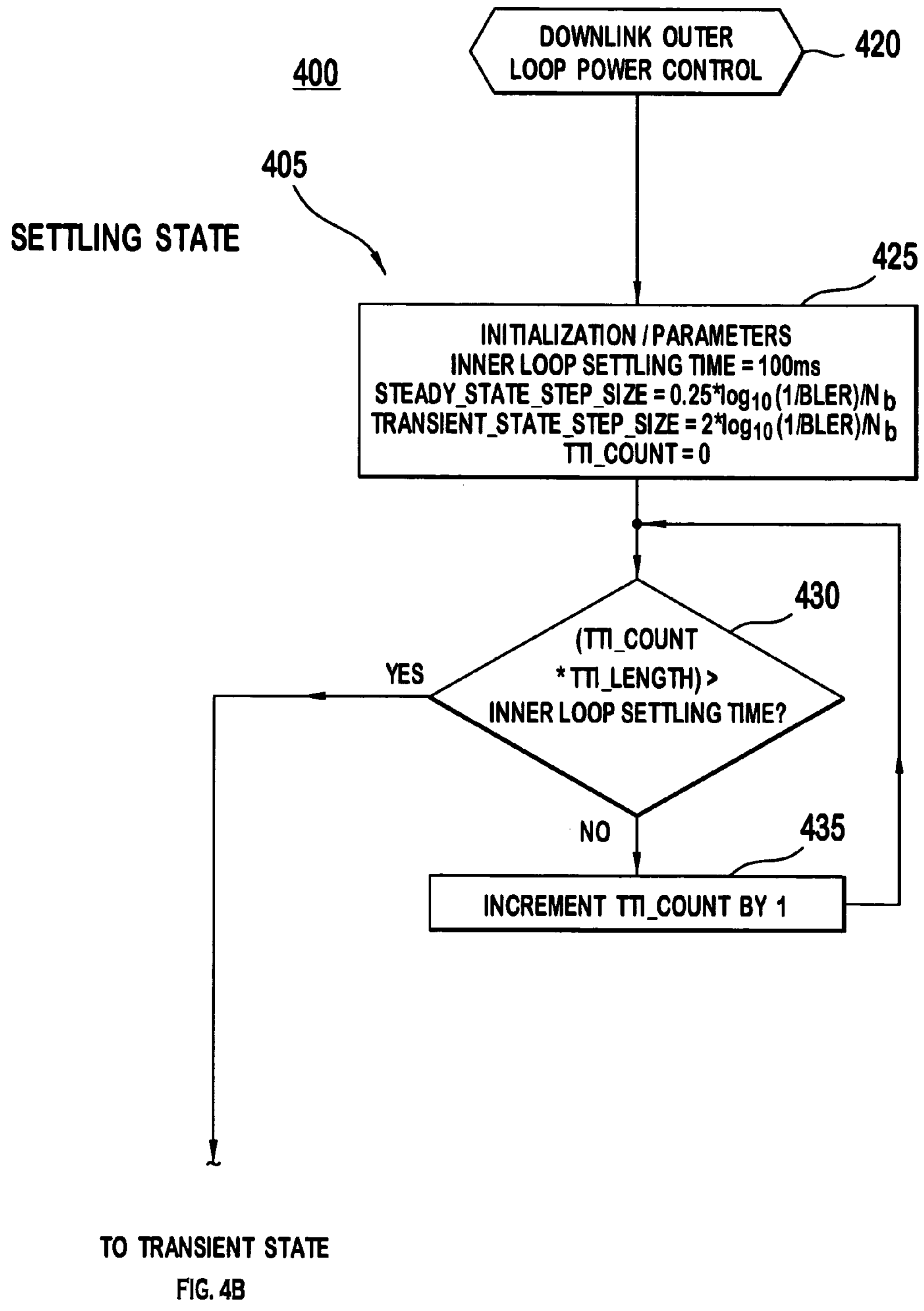
FIGS. 4A, 4B and 4C, taken together, is a flow chart of the SIR adjustment process of FIG. 3.
Figure 4B:
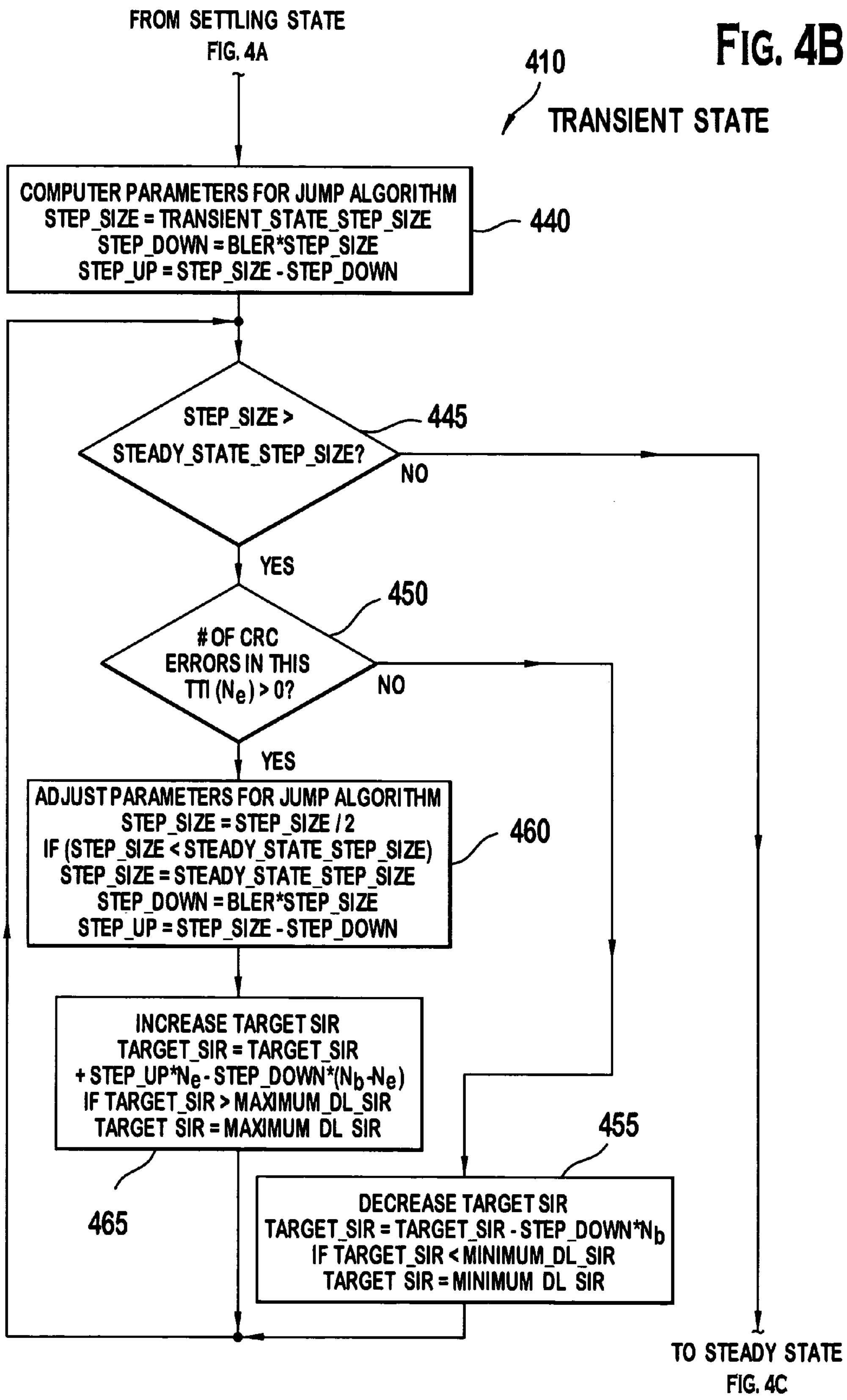
Figure 4C:
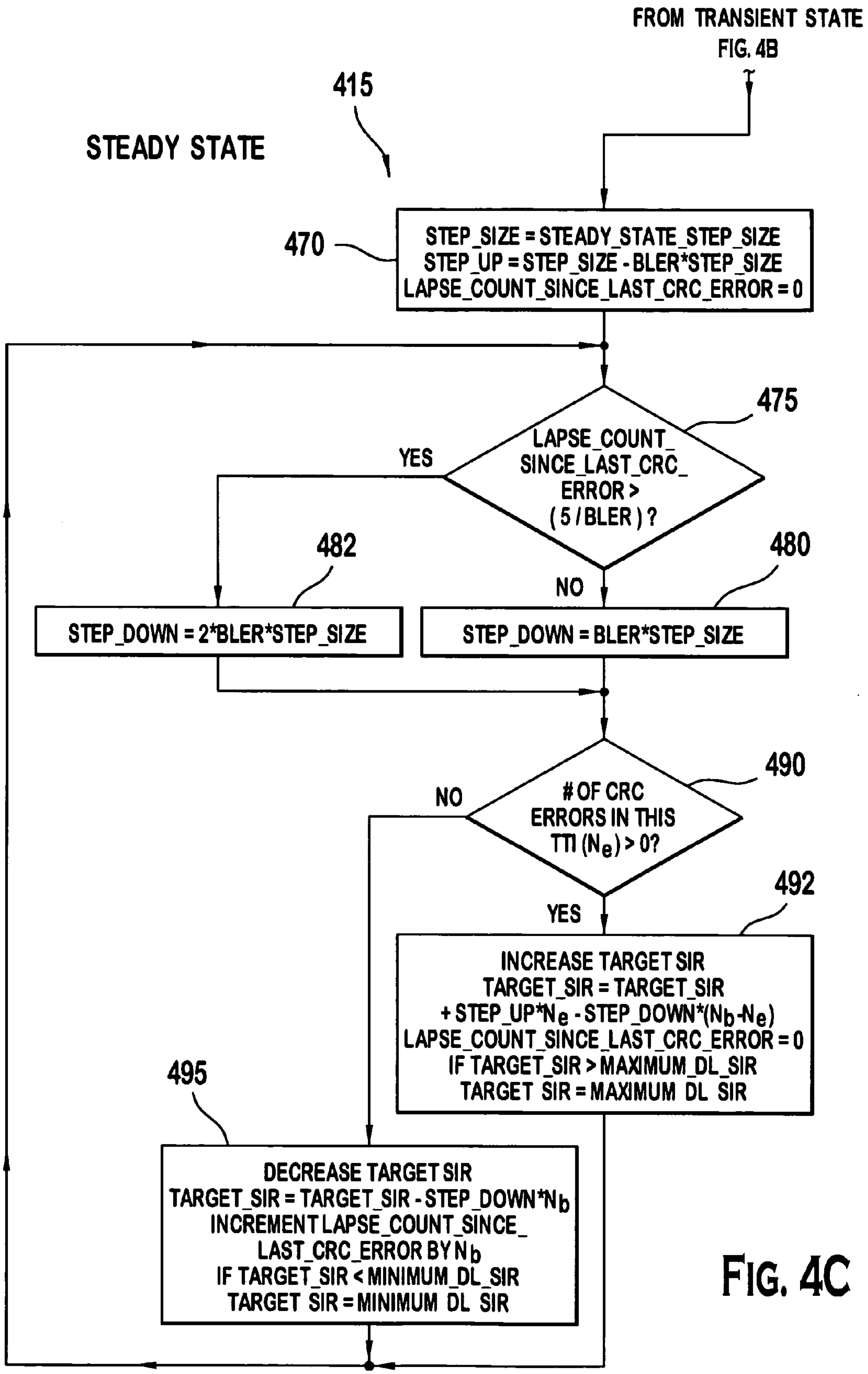

FIGS. 4A-4C, taken together, is a flow chart of an exemplary downlink outer loop power control process 400 including a settling state 405 (see FIG. 4A), transient state 410 (see FIG. 4B) and a steady state 415 (see FIG. 4C). After starting (step 420), the process 400 enters the settling state 405 in which initialization parameters are set (step 425). In the example, the parameters are set at:

inner loop settling time=100 ms;

steady state step size=$(0.25*\log_{10}(1/\text{BLER})/N_b)$;

transient state step size=$(2*\log_{10}(1/\text{BLER})/N_b)$; and

TTI count=0.

The inner loop settling time is based on the inner loop power control settling time and is used to compensate for systematic errors. $N_b$ is defined as the number of transport blocks per TTI. $N_e$ is defined as the number of CRC errors per TTI for the reference TrCH.

In step 430, a decision is then made as to whether the resulting product of multiplying the TTI count by the TTI length is greater than the inner loop settling time. Each TTI consists of $N_b$ blocks, depending on the data rate. Each block has a CRC. $N_e$ is the number of CRC errors within a TTI, i.e., $N_e$ CRC errors out of $N_b$ blocks per TTI. If the resulting product is not greater than the inner loop settling time, the TTI count is incremented (step 435) and step 430 is repeated. If the resulting product is greater than the inner loop settling time, the process goes to the transient state 410, in which computer parameters for a jump algorithm are set (step 440). The parameters may be:

step size=transient state step size;

step down=BLER*(step size); and step up=step size−step down.

In step 445, a determination is made as to whether the step size is greater than the steady state step size. If the transient state step size is determined in step 445 to be less than or equal to the steady state step size, then the process 400 goes to the steady state 415. If the transient state step size is determined in step 445 to be greater than the steady state step size, then a determination is made in step 450 as to whether the number of CRC errors in the respective TTI for $N_e$ is greater than zero. If the number of errors is determined not to be greater than zero in step 450, then target SIR is decreased (step 455). In the decrease of the target SIR, the target SIR is determined to be equal to the (target SIR)−(step down*$N_b$).

If the target SIR is less than a minimum DL SIR, the target SIR is deemed to be the minimum DL SIR. If the number of CRC errors is determined in step 450 to be greater than zero, the parameters for the jump algorithm are adjusted (step 460). In adjusting the parameters, the step size is set at half the previous step size. If the step size is less than the steady state step size, the step size is set at the steady state step size, the step down is set at (BLER)*(step size), and the step up is set at (step size)−(step down). When the target SIR is increased in step 465, the target SIR is set at (target SIR)+(step up)*($N_e$))−(step down)*($N_b$−$N_e$). If the target SIR is greater than the maximum DL SIR, the target SIR is deemed to be the maximum DL SIR. The process is looped so that after step 455 or 465, the process returns to step 445.

The steady state 415 is initiated after the step size is no longer greater than the steady state step size as determined in step 445. At that time, initial steady state parameters are set in step 470, in which:

step size=steady state step size;

step up=step size−BLER*(step size); and lapse count since the last CRC error=0.

A determination is then made (step 475) as to whether the lapse count since the last CRC error is greater than (5/BLER). If not, then the step down is established at (BLER)*(step size)(step 480). If the lapse count is greater than 5/BLER, the step down is set at 2*(BLER)*(step size)(step 482). In either case, a determination (step 490) is made as to whether the number of CRC errors in this TTI (Ne) is greater than zero. If the number of CRC errors is determined not to be greater than zero in step 490, then target SIR is decreased (step 495) where the target SIR is determined to be equal to the (target SIR)−(step down*$N_b$)

and the lapse count since the last CRC error is incremented by $N_b$. If the target SIR is less than a minimum DL SIR, the target SIR is deemed to be the minimum DL SIR.

If the number of CRC errors is determined to be greater than zero in step 490, the target SIR is increased (step 492) where the target SIR is set at (target SIR)+(step up)*($N_e$))−(step down)*($N_b$−$N_e$). The lapse count since the last CRC error is reset to zero. If the target SIR is greater than the maximum DL SIR, the target SIR is deemed to be the maximum DL SIR. The process is looped so that after step 492 or 495, the process returns to step 475.

If there are multiple blocks per TTI for the reference TrCH within a CCTrCH (=$N_b$), the target SIR will be adjusted as follows:

$$\text{target } SIR = \text{target } SIR + \text{step\_up} * N_e - \text{step\_down} * (N_b - N_e)$$

where $N_e$ is defined as the number of CRC errors per TTI for the reference TrCH.

While the present invention has been described in terms of the preferred embodiment, other variations which are within the scope of the invention as outlined in the claims below will be apparent to those skilled in the art.

What is claimed is:

1. A method of transmission power control for a wireless transmit receive unit (WTRU) that transmits data signals in a forward channel where the WTRU is configured to make forward channel power adjustments as a function of target metrics computed based on the data signals as received over the forward channel, the method comprising:

receiving data signals from the WTRU on the forward channel;

computing target metrics for the WTRU's forward channel power adjustments based on the detection of predetermined error conditions in the signals received on the forward channel including:

setting an initial target metric value;

after a preliminary period at the initial value, changing the target metric by a step up or a step down amount at time intervals of a predetermined length whereby the target metric is increased by the step up amount if a predetermined error condition has been detected in an immediately preceding time interval or is decreased by the step down amount if the predetermined error condition has not been detected the immediately preceding time interval; and setting the step up and step down amounts at a first relatively high transient state level and reducing the step up and step down amounts by a selected amount if a predetermined error condition has been detected in an immediately preceding time interval until they are reduced to a second relatively low steady state level.

2. The method of claim 1 wherein the computing target metrics further includes increasing the step up and step down amounts by a selected amount if a predetermined error condition has not been detected in a predetermined number of time intervals while they are set at the second relatively low steady state level.

3. The method of claim 1 in which the target metrics are target signal to interference ratios (SIRs) and cyclic redundancy checks are conducted to detect the predetermined error condition.

4. The method of claim 3 wherein step up amounts are significantly greater than respective step down amounts, the first level of step up and step down amounts are a factor of $2^n$ greater then the second level of step up and step down amounts, where n is a positive integer, and the step up and step down amounts are reduced by a factor of ½ if a predetermined error condition has been detected in an immediately preceding time interval until they are reduced to the second level.

5. The method of claim 4 wherein the computing target metrics further includes increasing the step up and step down amounts by a factor of 2 if a predetermined error condition has not been detected in a predetermined number of time intervals while they are set at the second relatively low steady state level.

6. The method of claim 4 wherein the computing target metrics further includes increasing the step up and step down amounts to the first level if a predetermined error condition has not been detected in a predetermined number of time intervals while they are set at the second relatively low steady state level.

7. The method of claim 3 wherein the WTRU is a network unit that transmits user signals on a downlink channel and the computing of target metrics is performed by a WTRU that receives the downlink channel.

8. The method of claim 3 in which closed loop transmission power control for the WTRU is implemented further comprising:

producing power step commands as a function of the computed target SIRs and transmitting the power step commands on a reverse channel; and receiving the power step commands by the WTRU on the reverse channel and computing power adjustments for forward channel transmissions based on the received power step commands.

9. A receiving wireless transmit receive unit (WTRU) for implementing transmission power control for a transmitting WTRU that transmits data signals in a forward channel where the transmitting WTRU is configured to make forward channel transmission power adjustments as a function of target metrics computed by the receiving WTRU, the receiving WTRU comprising:

a receiver for receiving data signals from a transmitting WTRU on a forward channel;

a processor for computing target metrics for implementing forward channel transmission power adjustments in the transmitting WTRU based on the detection of predetermined error conditions in the data signals received on the forward channel; and said processor configured to compute target metrics such that:

after a preliminary period at an initial value, the target metric is changed by a step up or a step down amount at time intervals of a predetermined length whereby the target metric is increased by the step up amount if a predetermined error condition has been detected in an immediately preceding time interval or the target metric is decreased by the step down amount if the predetermined error condition has not been detected in the immediately preceding time interval; and the step up and step down amounts are set a first relatively high transient state level and are reduced by a selected amount if a predetermined error condition has been detected in an immediately preceding time interval until they are reduced to a second relatively low steady state level.

10. The method of claim 9 wherein the method is implemented in a third generation partnership program (3GPP) wideband code division multiple access (W-CDMA) system where the WTRU is a network unit that transmits user signals on a downlink channel and the computing of target metrics is performed by a WTRU that receives the downlink channel and produces power step commands that are transmitted to the network unit on an uplink channel.

11. The invention of claim 9 wherein said processor is further configured to compute target metrics such that the step up and step down amounts are increased by a selected amount if a predetermined error condition has not been detected in a predetermined number of time intervals while they are set at the second relatively low steady state level.

12. The invention of claim 9 in which the target metrics are target signal to interference ratios (SIRs) and the receiving WTRU is configured to conduct cyclic redundancy checks to detect the predetermined error condition.

13. The invention of claim 12 wherein said processor is configured to compute target metrics such that step up amounts are significantly greater than respective step down amounts of a given level, the first level of step up and step down amounts are a factor of $2^n$ greater then the second level of step up and step down amounts, where n is a positive integer, and the step up and step down amounts are reduced by a factor of ½ if a predetermined error condition has been detected in an immediately preceding time interval until they are reduced to the second level.

14. The invention of claim 13 wherein said processor is further configured to compute target metrics such that the step up and step down amounts are increased by a factor of 2 if a predetermined error condition has not been detected in a predetermined number of time intervals while they are set at the second relatively low steady state level.

15. The invention of claim 13 wherein said processor is further configured to compute target metrics such that the step up and step down amounts are increased to the first level if a predetermined error condition has not been detected in a predetermined number of time intervals while they are set at the second relatively low steady state level.

16. The invention of claim 12 where the transmitting WTRU is a network unit that transmits user signals on a downlink channel wherein the receiving WTRU is configured to compute target metrics based on the detection of predetermined error conditions in the data signals received on the downlink channel.

17. The invention of claim 12 in which closed loop transmission power control for the transmitting WTRU is implemented wherein the receiving WTRU processor is further configured to produce power step commands as a function of the computed target SIRs and the receiving WTRU further comprising a transmitter configured to transmit the power step commands on a reverse channel to the transmitting WTRU.

18. The invention of claim 17 which is implemented for use in a third generation partnership program (3GPP) wideband code division multiple access (W-CDMA) system where the transmitting WTRU is a network unit that transmits user signals on a downlink wherein the receiving WTRU is configured to compute target metrics based on the detection of predetermined error conditions in the data signals received on the downlink channel.

* * * * *

UNITED STATES PATENT AND TRADEMARK OFFICE

CERTIFICATE OF CORRECTION

PATENT NO. : 7,266,385 B2
APPLICATION NO. : 10/771576
DATED : September 4, 2007
INVENTOR(S) : Chang-Soo Koo It is certified that error appears in the above-identified patent and that said Letters Patent is hereby corrected as shown below:

At column 2, line 16, before the words "a new", delete ".".

At column 4, line 63, after "CRC", delete "errors" and insert therefor --error--.

At column 5, line 54, before the word "set", delete "be".

At column 5, line 55, before the word "set", delete "be".

At column 6, line 64, before the words "is greater", delete "Ne" and insert therefor --Ne--.

At claim 1, column 7, line 46, after the word "detected", insert --in--.

At claim 4, column 8, line 1, after the word "greater", delete "then" and insert therefor --than--.

At claim 9, column 8, line 59, after the word "set", insert --at--.

At claim 13, column 9, line 20, after the word "greater", delete "then" and insert therefor --than--.

Signed and Sealed this

Twenty-fifth Day of March, 2008

JON W. DUDAS
*Director of the United States Patent and Trademark Office*